(12) United States Patent
Diot et al.

(10) Patent No.: US 10,068,137 B2
(45) Date of Patent: Sep. 4, 2018

(54) METHOD AND DEVICE FOR AUTOMATIC DETECTION AND TRACKING OF ONE OR MULTIPLE OBJECTS OF INTEREST IN A VIDEO

(71) Applicant: Alcatel Lucent, Boulogne Billancourt (FR)

(72) Inventors: Fabien Diot, Nozay (FR); Emmanuel Marilly, Nozay (FR); Elisa Fromont, Saint Etienne (FR); Baptiste Jeudy, Saint Etienne (FR); Olivier Martinot, Nozay (FR)

(73) Assignee: Alcatel Lucent, Boulogne Billancourt (FR)

( * ) Notice: Subject to any disclaimer, the term of this patent is extended or adjusted under 35 U.S.C. 154(b) by 12 days.

(21) Appl. No.: 14/783,648

(22) PCT Filed: Mar. 14, 2014

(86) PCT No.: PCT/EP2014/055081
§ 371 (c)(1),
(2) Date: Oct. 9, 2015

(87) PCT Pub. No.: WO2014/166695
PCT Pub. Date: Oct. 16, 2014

(65) Prior Publication Data
US 2016/0086039 A1 Mar. 24, 2016

(30) Foreign Application Priority Data
Apr. 12, 2013 (EP) .................................... 13305480

(51) Int. Cl.
*G06K 9/00* (2006.01)
*G06T 7/00* (2017.01)
(Continued)

(52) U.S. Cl.
CPC ..... *G06K 9/00751* (2013.01); *G06K 9/00758* (2013.01); *G06K 9/4604* (2013.01);
(Continued)

(58) Field of Classification Search
CPC ......... G06T 7/2006; G06T 2207/10016; G06T 2207/10024; G06T 2207/20072;
(Continued)

(56) References Cited

U.S. PATENT DOCUMENTS 5,438,357 A 8/1995 McNelley
5,867,584 A 2/1999 Hu et al.
(Continued)

FOREIGN PATENT DOCUMENTS

CN 101231755 A 7/2008
EP 2357608 A1 8/2011

OTHER PUBLICATIONS

Adriana Prado et al., "Plagram: un algorithme de fouille de graphes plans efficace," Conference D'Apprentissage (CAp), pp. 1-17, XP002712031, 2011.
(Continued)

*Primary Examiner* — Sean Conner
*Assistant Examiner* — Pinalben Patel
(74) *Attorney, Agent, or Firm* — Fay Sharpe LLP

(57) ABSTRACT

The invention relates to a method for automatic detection and tracking of one or multiple objects of interest in a video sequence comprising several successive frames (1) captured with a moving camera, comprising:—segmenting (32) each frame into regions depending on color and producing a segmented image (1');—deducing (34) from each segmented image (1') a region adjacency graph (11) comprising nodes and edges, wherein each node defines a region and each edge links two nodes of adjacent regions; wherein the region adjacency graphs (11) form a set of region adjacency
(Continued)

graphs;—extracting (36) from the set of region adjacency graphs frequent spatio-temporal patterns (13);—determining (38) degrees of dissimilarity between the trajectories of the extracted frequent spatio-temporal patterns (13) between successive frames (1); and—clustering (39) the frequent spatio-temporal patterns (13) to produce at least one cluster (25, 26, 27) corresponding to one object of interest among said one or multiple objects of interest according to the determined degrees of dissimilarity of the trajectories.

14 Claims, 5 Drawing Sheets

(51) Int. Cl.
| | |
|---|---|
| *G06K 9/52* | (2006.01) |
| *G06K 9/46* | (2006.01) |
| *G06K 9/62* | (2006.01) |
| *G06T 7/60* | (2017.01) |
| *G06T 7/20* | (2017.01) |
| *G06T 7/40* | (2017.01) |
| *G06T 7/11* | (2017.01) |
| *G06T 7/13* | (2017.01) |
| *G06T 7/215* | (2017.01) |
| *G06T 7/246* | (2017.01) |
| *G06T 7/90* | (2017.01) |

(52) U.S. Cl.
CPC ............ *G06K 9/4652* (2013.01); *G06K 9/52* (2013.01); *G06K 9/6215* (2013.01); *G06K 9/6218* (2013.01); *G06T 7/11* (2017.01); *G06T 7/13* (2017.01); *G06T 7/215* (2017.01); *G06T 7/246* (2017.01); *G06T 7/60* (2013.01); *G06T 7/90* (2017.01); *G06K 2009/4666* (2013.01); *G06T 2207/10016* (2013.01); *G06T 2207/10024* (2013.01); *G06T 2207/20072* (2013.01); *G06T 2207/30241* (2013.01)

(58) Field of Classification Search
CPC .......... G06T 2207/30241; G06T 7/408; G06T 7/2033; G06T 7/0085; G06T 7/0081; G06T 7/60; G06K 9/00751; G06K 2009/4666; G06K 9/6215; G06K 9/52; G06K 9/4652; G06K 9/4604; G06K 9/6218
See application file for complete search history.

(56) References Cited

U.S. PATENT DOCUMENTS

| | | | | |
|---|---|---|---|---|
| 6,901,110 | B1* | 5/2005 | Tsougarakis | G06T 7/2013 348/E5.066 |
| 7,375,731 | B2* | 5/2008 | Divakaran | G06F 17/30787 345/581 |
| 7,426,301 | B2* | 9/2008 | Porikli | G06K 9/00335 382/181 |
| 7,736,313 | B2* | 6/2010 | Luo | A61B 8/0825 128/922 |
| 7,949,050 | B2* | 5/2011 | Xu | G06K 9/00765 348/700 |
| 8,169,497 | B2* | 5/2012 | Wan | G06F 17/30781 348/222.1 |
| 8,213,679 | B2 | 7/2012 | Yao | |
| 8,213,680 | B2 | 7/2012 | Fitzgibbon et al. | |
| 8,824,801 | B2* | 9/2014 | Fitzgibbon | G06T 7/2033 382/107 |
| 9,256,955 | B2* | 2/2016 | O'Gorman | G06K 9/00718 |
| 9,286,693 | B2* | 3/2016 | Yoo | G06T 7/2033 |
| 9,881,380 | B2* | 1/2018 | Sorkine Hornung | G06K 9/00718 |
| 2008/0123900 | A1* | 5/2008 | Ma | G06K 9/32 382/103 |
| 2008/0159590 | A1* | 7/2008 | Yi | G06F 17/3079 382/103 |
| 2009/0274377 | A1* | 11/2009 | Kweon | G06K 9/6272 382/225 |
| 2011/0013840 | A1* | 1/2011 | Iwasaki | G06T 7/215 382/173 |
| 2012/0106794 | A1* | 5/2012 | Iwasaki | G06T 7/2006 382/103 |
| 2012/0321128 | A1 | 12/2012 | Medioni et al. | |
| 2014/0334670 | A1* | 11/2014 | Guigues | G06T 7/2046 382/103 |
| 2015/0055821 | A1* | 2/2015 | Fotland | G06K 9/3241 382/103 |
| 2015/0116597 | A1* | 4/2015 | Chandraker | H04N 5/147 348/699 |
| 2015/0287214 | A1* | 10/2015 | O'Gorman | G06T 7/2093 348/159 |
| 2016/0379055 | A1* | 12/2016 | Loui | G06K 9/00718 382/103 |

OTHER PUBLICATIONS

A. Bakowski et al., "Video Surveillance Tracking Using Colour Region Adjacency Graphs," Seventh International Conference on Image Processing and Its Applications, IEEE, Publication No. 455, vol. 2, pp. 794-798, XP006501150, 1999.
G. L. Foresti et al., "A Robust Feature Tracker for Active Surveillance of Outdoor Scenes," Electronic Letters on Computer Vision and Image Analysis 1(1)L 21-34, pp. 21-34, XP002712032, 2003.
International Search Report for PCT/EP2014/055081 dated Jun. 25, 2014.
Fabien Diot, "Graph mining for object tracing in videos," thesis in Information Science at Université Jean Monnet—Saint-Etienne, France, Jun. 3, 2014.
Simon Conseil, et al., "Suivi Tridimensional en Stéréovision," GRETSI 2005, 4 pages.
Kaihua Zhang, et al., "Real-Time Compressive Tracking," ECCV 2012, Part III, pp. 866-879.
Zdenek Kalal, et al., "Tracking-Learning-Detection," IEEE Transactions on Pattern Analysis and Machine Intelligence, vol. 6, No. 1, Jan. 2010.
Simon Conseil, et al., "Three Dimensional Fingertip Tracking in Stereovision," ACIVS 2005, LNCS 3708, pp. 9-16, 2005.
Tianyang Ma, "Maximum Weight Cliques with Mutex Constraints for Video Object Segmentation," CVPR 2012, 8 pages.
Pedro Felzenszwalb, et al., "Efficient Graph-Based Image Segmentation," International Journal of Computer Vision 59(2), pp. 167-181, 2004.
Alain Trémeau, et al., "Regions Adjacency Graph Applied to Color Image Segmentation," IEEE Transactions on Image Processing, 2000, 19 pages.
Adriana Prado, et al., "Mining Spatiotemporal Patterns in Dynamic Plane Graphs," Intelligent Data Analysis, 2013, pp. 1-27.

* cited by examiner

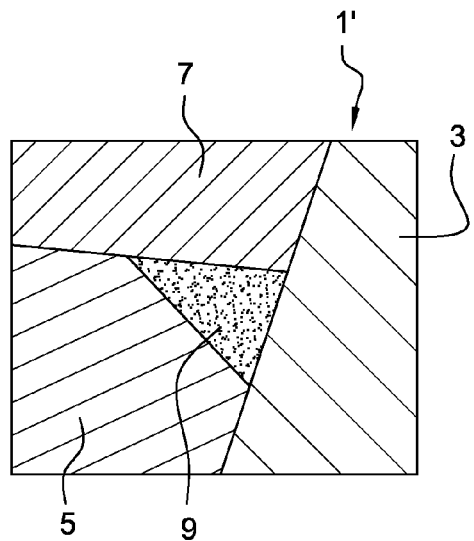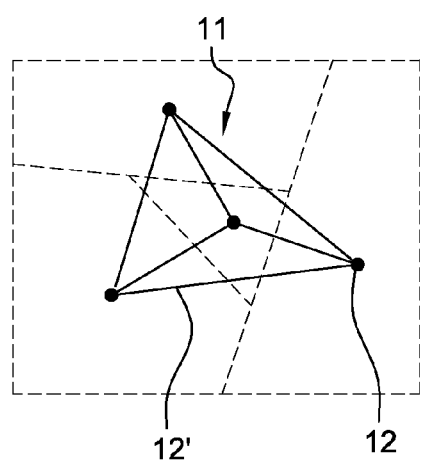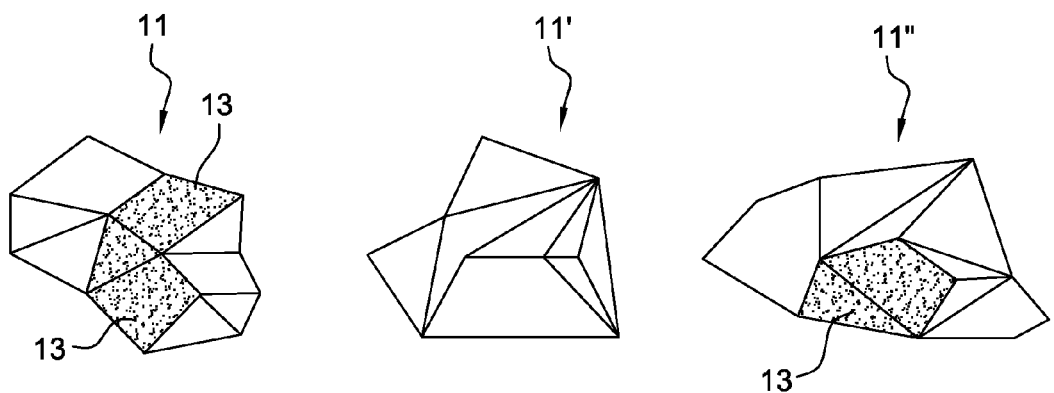

METHOD AND DEVICE FOR AUTOMATIC DETECTION AND TRACKING OF ONE OR MULTIPLE OBJECTS OF INTEREST IN A VIDEO

TECHNICAL FIELD

The present invention relates to the field of image processing applied to videos. More particularly, the invention concerns the detection and tracking of one or multiple objects of interest in a video sequence captured with a moving camera.

In the following, the term "moving camera" is used to designate a camera moving in a steady scene as well as a camera capturing varying scenes, i. e., in which the background or surroundings are changing from one scene or frame to another scene or frame.

BACKGROUND

The detection and tracking of objects of interest in a video sequence, like the principal persons in a movie or the most important actions in a broadcast football match, allows for knowing the position and the trajectories of these objects within the video. This knowledge is essential for the automatic summarization of videos. The summarization of videos has several purposes, for example, in video surveillance applications, video indexing, or other interactive multimedia applications requiring the management of video content.

When dealing with videos captured with a non-moving camera, the objects of interest can be detected using background subtraction techniques. An example of such a technique is disclosed in S. Conseil et al., "*Suivi Tridimensionnel en Stéréovision*", GRETSI, 2005, wherein the background is taken as a reference image subtracted from all frames in order to detect a human hand.

However, background subtraction methods are not suitable in the case of video sequences captured with a moving camera since the background is susceptible to change from one scene or frame to another scene or frame and may not be used as a reference. There exist several alternative methods and devices for tracking objects in videos captured with a moving camera. Some examples thereof are described in the following.

According to a first technique, the user tags the object of interest, i.e., the user manually selects a target object of interest in a frame via a graphical user interface (GUI). Motion and appearance models are then used to follow the selected object across the video sequence in order to know its trajectory.

A second approach enabling the automatic tracking of objects in a video sequence captured with a moving camera, disclosed in U.S. Pat. No. 5,867,584, requires the user to specify a window including the object. This window is then compared to test windows in the subsequent frames in order to find the best match window which is most similar with the specified window containing the object.

In a third approach, a priori knowledge of the object to be tracked is required, for example, in the form of databases containing features associated with the object. The system learns a model of the objects of interest in advance, thereby enabling it to detect similar objects within the frames of the video. The database of the system comprises a number of training samples, for example, different kinds of human faces, in order to find faces in the video. A data association step is subsequently performed to link detections of the same object across the video frames into trajectories or tracks. An example of this third approach may be found in T. Ma, L. J. Latecki, "*Maximum Wright Cliques with mutex Constraints for Object Segmentation*", IEEE Conference on Computer Vision and Pattern Recognition (CVPR), June 2012.

With the techniques described above, either user interaction and/or prior knowledge of the objects of interest is required, or the types of objects that may be detected are limited, for example by the category of the object the system has been trained for.

According to the foregoing, there exists a need for improved automatic detection and tracking of objects of interest in videos captured with a moving camera, without the input of a priori knowledge and independently of databases required for learning models.

SUMMARY OF EXEMPLARY EMBODIMENTS

Embodiments of the present invention provide an improved method and an improved device for detecting objects of interest in videos captured with a moving camera that resolve the above mentioned problems.

According to a first aspect, there is provided a method for automatic detection and tracking of one or multiple objects of interest in a video sequence comprising several successive frames captured with a moving camera, the method comprising the steps of:

for each frame of the video sequence:
    segmenting the frame into regions depending on colour and producing a segmented image,
    deducing from the segmented image a region adjacency graph comprising nodes and edges, wherein each node defines a region and each edge links two nodes of adjacent regions of the segmented image,
wherein the region adjacency graphs deduced from the segmented images for said several successive frames form a set of region adjacency graphs,
extracting from the set of region adjacency graphs frequent spatio-temporal patterns,
determining degrees of dissimilarity between the trajectories of the extracted frequent spatio-temporal patterns between successive frames, and
clustering the frequent spatio-temporal patterns to produce at least one cluster corresponding to one object of interest among said one or multiple objects of interest according to the determined degrees of dissimilarity of the trajectories.

In some embodiments, the extracting step may comprise extracting spatio-temporal patterns which occur at least once in a predetermined number of region adjacency graphs among the set of region adjacency graphs.

In some embodiments, the extracting step may comprise:
    determining, for each spatio-temporal pattern, an Euclidian distance separating two successive occurrences of the spatio-temporal pattern in two distinct region adjacency graphs, and
    extracting the spatio-temporal patterns for which the determined Euclidian distance is below a spatial threshold.

In some embodiments, the extracting step may comprise:
    determining, for each spatio-temporal pattern, the number of region adjacency graphs separating two successive occurrences of the spatio-temporal pattern in two distinct region adjacency graphs, and
    extracting the spatio-temporal patterns for which the determined number of region adjacency graphs is below a temporal threshold.

In some embodiments, the step of determining the degrees of dissimilarity of the trajectories may comprise:

determining a centroid for each spatio-temporal pattern in the region adjacency graphs, determining an Euclidian distance between two distinct centroids corresponding to two distinct spatio-temporal patterns in each region adjacency graph, and calculating an average of the Euclidian distances between two distinct centroids on several region adjacency graphs.

Preferably, the step of determining the degrees of dissimilarity of the trajectories may further comprise:

interpolating, for one or several region adjacency graphs separating two successive occurrences of each of the spatio-temporal patterns in two distinct region adjacency graphs, a centroid, and calculating an average of the Euclidian distances between two distinct centroids on all region adjacency graphs.

In some embodiments, the clustering step may comprise clustering the spatio-temporal patterns for which the calculated average of the Euclidian distances between two distinct centroids is below a dissimilarity threshold.

Advantageously, the clustering step may further comprise:

clustering the frequent spatio-temporal patterns to produce a hierarchized set of clusters corresponding to multiple objects of interest, and selecting among the hierarchized set of clusters only the clusters for which the degree of dissimilarity is below a predetermined threshold.

Any of the above methods may further include the step of summarizing the video sequence using the one or multiple objects of interest detected and tracked in the video sequence in order to obtain a video summary.

Preferably, the summarizing step comprises determining interacting objects of interest based on spatial overlapping of their trajectories.

According to a second aspect, there is provided a device for automatic detection and tracking of one or multiple objects of interest in a video sequence comprising several successive frames captured with a moving camera, the device comprising:

a frame extractor configured to segment each frame of the video sequence into regions depending on colour and producing a segmented image for each frame, a graph engine configured to deduce from each of the segmented images a region adjacency graph comprising nodes and edges, wherein each node defines a region and each edge links two nodes of adjacent regions of the segmented image, wherein the region adjacency graphs deduced from the segmented images for said several successive frames form a set of region adjacency graphs, a data mining engine configured to extract from the set of region adjacency graphs frequent spatio-temporal patterns, and a clustering engine configured to:
  determine degrees of dissimilarity between the trajectories of the extracted frequent spatio-temporal patterns between successive frames, and
  cluster the frequent spatio-temporal patterns to produce at least one cluster corresponding to one object of interest among said one or multiple objects of interest according to the determined degrees of dissimilarity of the trajectories.

Advantageously, the device may further comprise a summary engine configured to summarize the video sequence using the one or multiple objects of interest detected and tracked in the video sequence in order to obtain a video summary.

According to a third aspect, there is provided a computer readable medium comprising instructions for controlling a computer system to perform a method for automatic detection and tracking of one or multiple objects of interest in a video sequence comprising several successive frames captured with a moving camera according to embodiments of the first aspect of the present disclosure.

According to a fourth aspect, there is provided a computer program product comprising computer-executable instructions for performing a method for automatic detection and tracking of one or multiple objects of interest in a video sequence comprising several successive frames captured with a moving camera according to embodiments of the first aspect of the present disclosure, when the program is run on a computer.

Additional aspects and advantages of methods and devices according to embodiments disclosed herein will be set forth, in part, in the detailed description, figures and any claims which follow, and in part will be derived from the detailed description. It is to be understood that both the foregoing general description and the following detailed description are only exemplary and do not limit the claimed inventions.

BRIEF DESCRIPTION OF THE DRAWINGS

Exemplary embodiments of methods and devices are described with reference to the accompanying drawings, in which:

FIG. 2A represents an example of a segmented video frame, FIG. 2B schematically illustrates an example of a region adjacency graph built from the segmented video frame of FIG. 2A, FIG. 2C represents an example of a set of region adjacency graphs containing a pattern, FIG. 2D shows the pattern occurring three times in the set of region adjacency graphs of FIG. 2C, FIG. 3A schematically illustrates a number of video frames containing the pattern of FIG. 2B.

DETAILED DESCRIPTION

Figure 1:
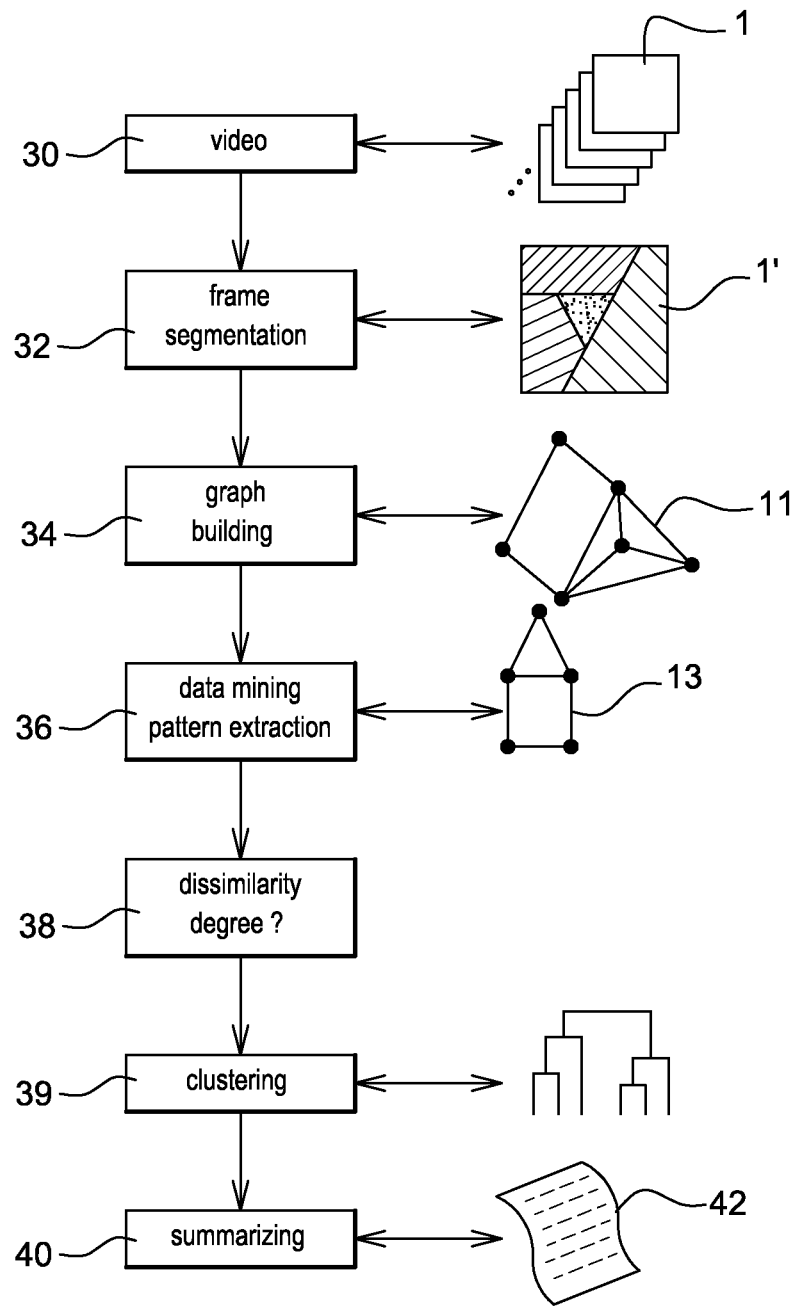
FIG. 1 schematically illustrates a flow diagram of a method according to an embodiment of the present disclosure.

The figures and the following description illustrate exemplary embodiments. In the various figures, elements with similar structures and/or functions may be denoted by like reference numerals.

FIG. 1 shows a flow diagram illustrating a method for automatic detection and tracking of one or multiple objects of interest in a video sequence. A video or video sequence received in a first step 30 comprises several frames 1 or images temporally succeeding each other. Frames 1 are captured with a moving camera. In a second step 32, each frame 1 or image of the video sequence is segmented into regions, thereby producing a plurality of segmented frames 1' or images. Each frame 1 is segmented according to the colour of the pixels of the frame. Thus, each region of a segmented frame 1' corresponds to one colour. To carry out the segmenting step 32, a colour segmentation algorithm may be used. An example of one segmented video frame 1' is shown in FIG. 2A. Here, the segmented frame 1 consists of four regions 3, 5, 7, 9, wherein each of the regions represents a colour.

Referring to FIG. 1, in a third step 34, a graph 11 is built for each segmented frame 1'. The graph 11 is also called region adjacency graph because it represents the segmented frame 1' according to pairs of adjacent regions. FIG. 2B schematically illustrates an example of a region adjacency graph 11 deduced from the segmented video frame 1' of FIG. 2A. The region adjacency graph 11 comprises nodes 12 and edges 12', wherein each node 12 defines a region 3, 5, 7, 9 and each edge 12' links two nodes 12 of adjacent regions 3, 5, 7, 9 of the segmented image 1'. The node in each region may be located in the barycentre of the region. Each of the nodes 12 is assigned a label which represents the colour of the region in which it is located. The region adjacency graphs 11 deduced from the segmented images 1' for several or all successive frames 1 form a set of region adjacency graphs.

FIG. 2C illustrates an example of a set of three region adjacency graphs 11, 11', 11". Each of the three graphs 11, 11', 11" corresponds to one segmented frame of a video sequence. The representation of the segmented frames or images of a video in form of region adjacency graphs allows for the modelling of the topology of the images.

Still referring to FIG. 1, in a fourth step 36, frequent patterns 13 are extracted from the set of region adjacency graphs. The extraction step 36 may also be referred to as a data mining step. Further, the extracted patterns may be referred to as frequent spatio-temporal patterns.

For example, frequent spatio-temporal patterns 13, among other spatio-temporal patterns, are those patterns which occur at least once in a predetermined number of region adjacency graphs 11 among the set of region adjacency graphs. The same pattern may also occur more than once in one region adjacency graph 11. This is illustrated in FIG. 2C, showing the example set of region adjacency graphs 11, 11', 11", two of which contain a pattern 13, whereby, in this figure, the first graph 11 contains the pattern 13 twice and the last graph 11" contains the pattern 13 once. In this example, the pattern 13 may be considered frequent since it occurs in two of three graphs. FIG. 2D shows the frequent spatio-temporal pattern 13 occurring three times in the set of region adjacency graphs of FIG. 2C.

Figure 3A:
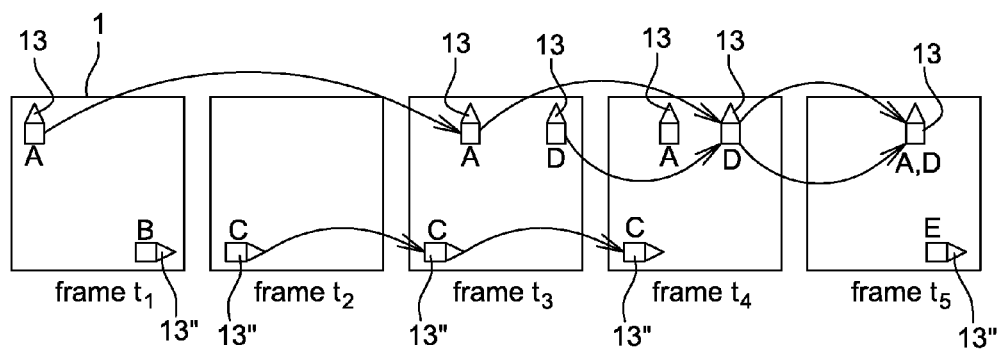
FIG. 3B represents an occurrence graph corresponding to the pattern occurrences shown in FIG. 3A.

In some embodiments, in order to perform the extraction step 36, an Euclidian distance separating two successive occurrences of the spatio-temporal pattern 13 in two distinct region adjacency graphs 11 is determined for each spatio-temporal pattern 13. The spatio-temporal patterns 13 for which the determined Euclidian distance is below a spatial threshold are then extracted. An example illustrating this way of processing is shown in FIG. 3A. In FIG. 3A, five successive frames 1 are shown, some or all of which include one or two of two spatio-temporal patterns 13, 13". Patterns 13, 13" are contained in region-adjacency graphs that are omitted in FIG. 3A for the sake of legibility. Pattern 13 has six occurrences in total, and pattern 13" has five occurrences in total. The occurrences labelled "A" of pattern 13 may be considered satisfying the constraint of the spatial threshold since they are close to one another from one frame to another, i.e., the pattern 13 has not moved too far between frames $t_1$ and $t_3$, frames $t_3$ and $t_4$, and frames $t_4$ and $t_5$, respectively. The same applies to the occurrences labelled "D" of pattern 13 and the occurrences labelled "C" of pattern 13". The patterns for which the Euclidian distance is below the spatial threshold are connected with arrows in FIG. 3A. For example, for pattern 13, occurrence "A" in frame $t_1$ is not connected to occurrence "D" in frame $t_3$ because they are too distant to each other.

According to these embodiments, it is possible, in the extraction step 36, to discard patterns of which the occurrences are spatially too far apart within the set of region adjacency graphs. Indeed, spatially close patterns are more likely to represent parts of the same object of interest.

In some embodiments, in order to perform the extraction step 36, the number of region adjacency graphs 11 separating two successive occurrences of the spatio-temporal pattern 13 in two distinct region adjacency graphs 11 is determined for each spatio-temporal pattern 13. This number may be referred to as intermediate graphs (or intermediate frames since one graph corresponds to one frame). The spatio-temporal patterns 13 for which the determined number of region adjacency graphs 11 is below a temporal threshold are then extracted. Again referring to FIG. 3A, the occurrences labelled "C" of pattern 13" may be considered satisfying the constraint of the temporal threshold since the number of region adjacency graphs 11 (i.e., frames) separating two successive occurrences of the pattern 13" in the region adjacency graph of frame $t_2$ and the region adjacency graph of frame $t_3$ is zero. The same applies to occurrences "C" in frames $t_3$ and $t_4$. Similarly, number of region adjacency graphs 11 (i.e., frames) separating two successive occurrences of the pattern 13 in the region adjacency graph of frame $t_1$ and the region adjacency graph of frame $t_3$ is one, which may be considered satisfying the temporal constraint. The patterns for which the determined intermediate number of frames (or graphs) is below the temporal threshold are connected with arrows in FIG. 3A. For example, the occurrence labelled "B" in frame $t_1$ is not connected to the occurrence labelled "E" in frame $t_5$ because they are temporally isolated with respect to each other.

According to these embodiments, it is possible, in the extraction step 36, to discard patterns of which the occurrences are temporally too far apart within the set of region adjacency graphs. Indeed, temporally close patterns are more likely to represent parts of the same object of interest.

Figure 3B:
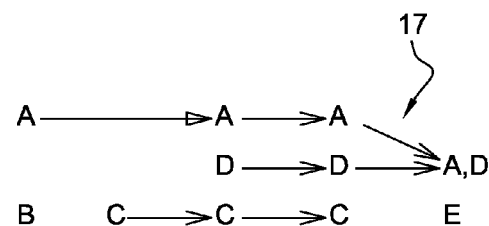

Furthermore, it is possible to represent frequent spatio-temporal patterns in an occurrence graph, as shown in FIG. 3B. In the occurrence graph 17, each node (A-E) corresponds to an occurrence of a frequent pattern. Edges are represented by arrows that connect frequent patterns if they comply with the temporal and spatial constraints described above, i.e., if they are close enough in space and time. Thus, in the occurrence graph 17, frequent spatio-temporal patterns are illustrated by connected nodes. The frequent spatio-temporal patterns (A, D, and C in FIG. 3B) each represent a part of an object of interest.

Again referring to FIG. 1, in a fifth step 38, degrees of dissimilarity between the trajectories of the extracted frequent spatio-temporal patterns 13 between successive frames 1 are determined. In some embodiments, the step 38 of determining the degrees of dissimilarity of the trajectories comprises the following steps.

Figure 4A:
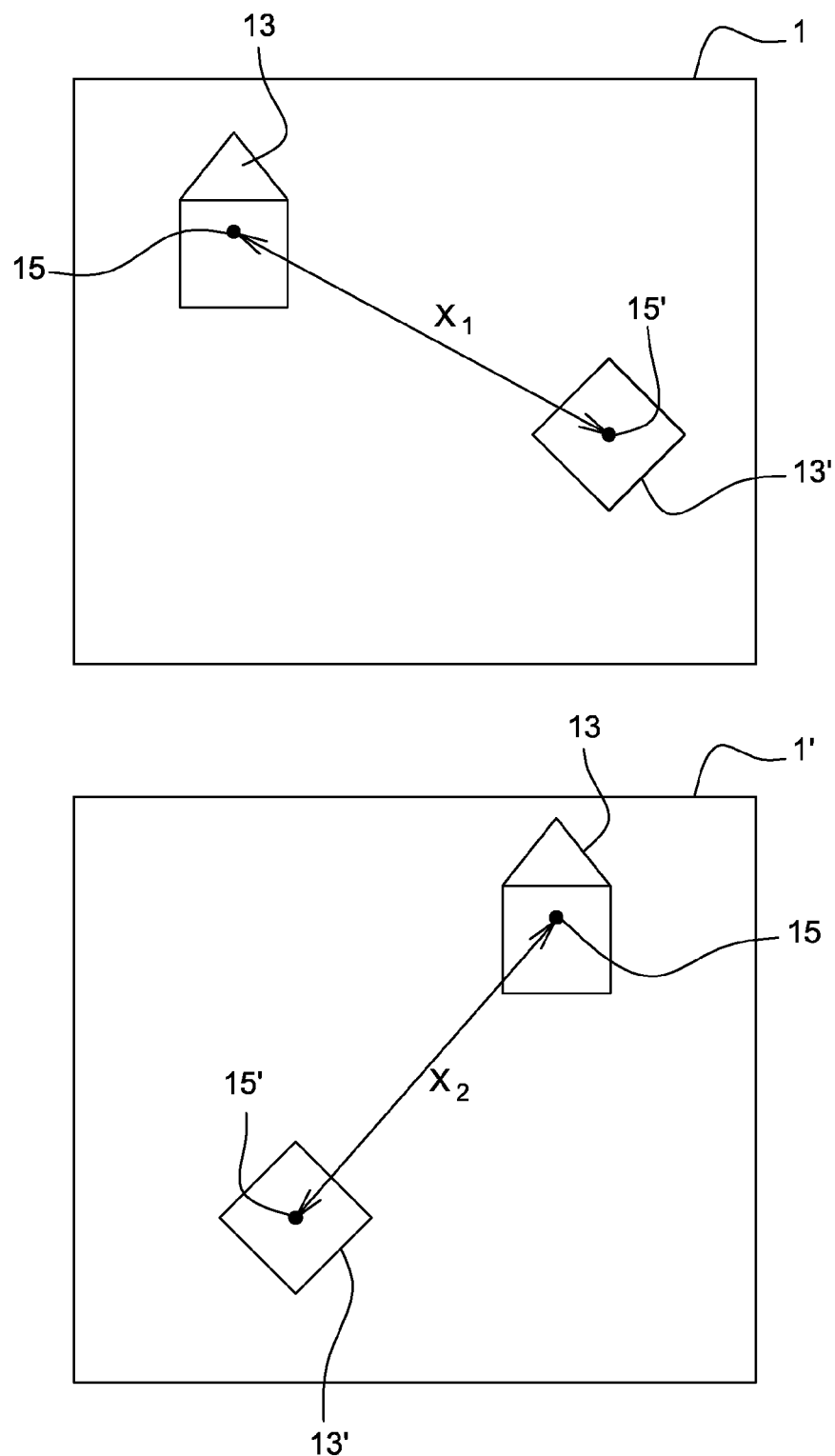
FIG. 4A illustrates the dissimilarity measure used to carry out the clustering step of the method according to an embodiment of the present disclosure, FIG. 4B schematically shows an example of a set clusters of extracted frequent spatio-temporal patterns obtained from the clustering step of the method according to an embodiment of the present disclosure, and FIG. 5 schematically illustrates a device for automatic detection and tracking of one or multiple objects of interest in a video according to an embodiment of the present disclosure.

First, a centroid for each spatio-temporal pattern 13, 13' in the region adjacency graphs is determined. FIG. 4A illustrates two frames 1, 1', corresponding to two region adjacency graphs (not shown), each including two frequent spatio-temporal patterns 13, 13'. The centroids of the patterns are indicated by black points 15, 15'. The centroid of a spatio-temporal pattern in a frame (or graph) corresponds to the barycentre of all occurrences of this pattern in this frame (or graph). In the example shown in FIG. 4A, only one occurrence for each of the patterns 13, 13' is shown for the sake of legibility.

Second, an Euclidian distance $x_t$ (t=1, 2 in FIG. 4A) between two distinct centroids 15, 15' corresponding to two distinct spatio-temporal patterns 13, 13' in each region adjacency graph is determined.

Third, an average of the Euclidian distances $x_t$ between two distinct centroids 15, 15' on several region adjacency graphs is calculated.

Accordingly, in the embodiments described above, the degrees of dissimilarity dis of the trajectories are computed using the following formula:

$$dis = \frac{\sum_{t=1}^{n} x_t}{n}, \quad (1)$$

wherein $x_t$ corresponds to the Euclidian distance between the centroids of two spatio-temporal patterns in frame t, and n is the number of frames that are considered.

In some embodiments, in order to perform the step 38 of determining the degrees of dissimilarity of the trajectories, a centroid is interpolated for one or several region adjacency graphs separating two successive occurrences of each of the spatio-temporal patterns in two distinct region adjacency graphs. Indeed, some frequent spatio-temporal patterns may not occur in each of the successive frames (or region adjacency graphs), i.e., they may comply with the spatial and temporal constraints explained above even if there are several frames between their occurrences. In this case, a centroid is interpolated for the frames in which the frequent spatio-temporal patterns do not occur in order to be able to compute the Euclidian distance between centroids in each of the frames (i.e., region adjacency graphs). An average of the Euclidian distances between two distinct centroids on all region adjacency graphs may then be calculated.

Again referring to FIG. 1, in a sixth step 39, the frequent spatio-temporal patterns 13 are clustered in order to produce at least one cluster corresponding to one object of interest among said one or multiple objects of interest according to the determined degrees of dissimilarity of the trajectories.

In some embodiments, the clustering step 39 may advantageously comprise clustering the spatio-temporal patterns for which the calculated average of the Euclidian distances between two distinct centroids is below a dissimilarity threshold. The average of the Euclidian distances between two distinct centroids may be calculated using equation (1).

In some embodiments, the clustering step 39 comprises the following steps.

Figure 4B:
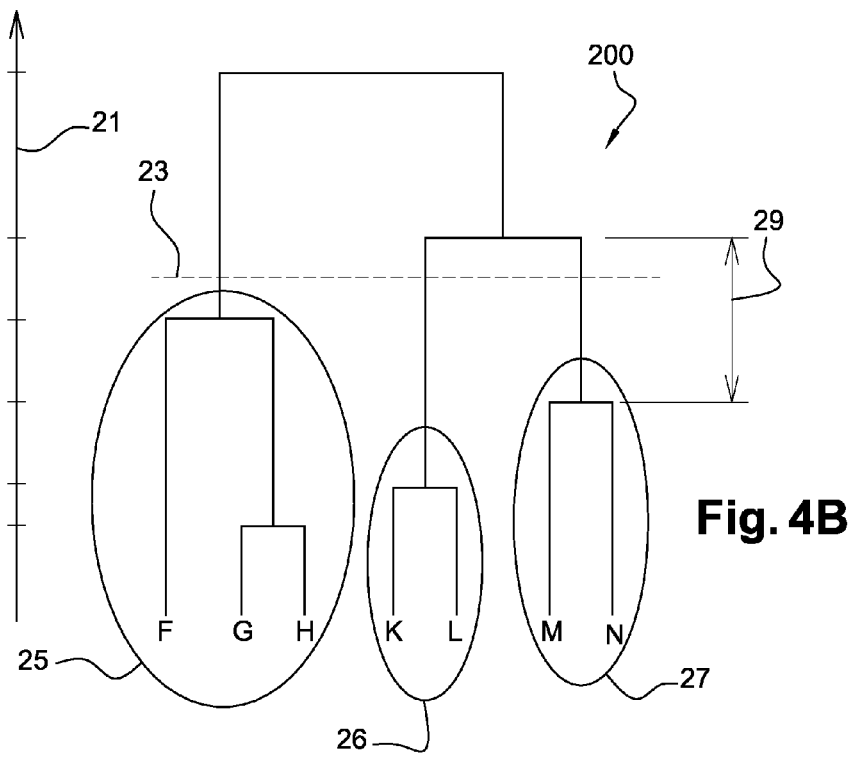

First, the frequent spatio-temporal patterns are clustered to produce a hierarchized set of clusters corresponding to multiple objects of interest. FIG. 4B illustrates an example of such a set 200 of clusters 25, 26, 27 of extracted frequent spatio-temporal patterns F, G, H, K, L, M, N. The ordinate 21 represents the degree of dissimilarity between the trajectories of the frequent spatio-temporal patterns F, G, H, K, L, M, N. For a given degree of dissimilarity, two frequent spatio-temporal patterns are grouped together in a cluster.

The obtained cluster may then, with an increasing degree of dissimilarity, be grouped with another cluster or another frequent spatio-temporal pattern. This is done until all frequent spatio-temporal patterns are contained in a single cluster. In the example of FIG. 4B, patterns G and H are clustered for a first dissimilarity degree, and the cluster G, H is then clustered with pattern F for a second dissimilarity degree greater than the first one, in order to obtain cluster 25.

Second, only the clusters, among the hierarchized set 200 of clusters, for which the degree of dissimilarity is below a predetermined threshold are selected. Still referring to FIG. 4B, clusters 25, 26, 27 are selected. Cluster 25 contains three frequent spatio-temporal patterns F, G, H, and clusters 26, 27 each contain two frequent spatio-temporal patterns K, L and M, N. In this example, the dashed line 23 represents the predetermined threshold, and all clusters being below this line 23 are selected.

According to these embodiments, it is possible thanks to the step 38 of determining the degrees of dissimilarity of the trajectories of frequent spatio-temporal patterns and the clustering step 39, to regroup parts of objects found in the extraction step having similar trajectories. Thus, entire objects of interest may be found in a completely automatic manner.

Advantageously, the threshold of the degree of dissimilarity of the pattern trajectories may be set using a quantity called lifetime of a cluster. The lifetime of a cluster is the difference between the degree of dissimilarity at which the cluster is formed and the degree of dissimilarity at which the cluster is combined with another cluster or frequent spatio-temporal pattern. In FIG. 4B, the lifetime 29 of cluster 27 is exemplarily illustrated. It is then possible to consider the cluster with the longest lifetime and to select the clusters formed at a degree of dissimilarity which is below the degree of dissimilarity at which the considered cluster is combined with another cluster or pattern. In the example of FIG. 4B, cluster 26 may be considered to have the longest lifetime.

Again referring to FIG. 1, any of the above described methods according to embodiments disclosed herein may further comprise the step 40 of summarizing the video sequence using the one or multiple objects of interest detected and tracked in the video sequence in order to obtain a video summary 42. Preferably, the summarizing step 40 may comprise the step of determining interacting objects of interest based on spatial overlapping of their trajectories. The summary 42 may, for example, consist of a set of video sequences showing the main objects and their interactions involved in a video or movie. The summary 42 may also consist of a text, an Extensible Markup Language (XML) document, or the like.

Video summarization is one possible implementation example of the method according to embodiments of the present disclosure. Another example is video editing in which an editor may be enabled to detect and track the main objects and their relationships in the post-production process of a video.

Figure 5:
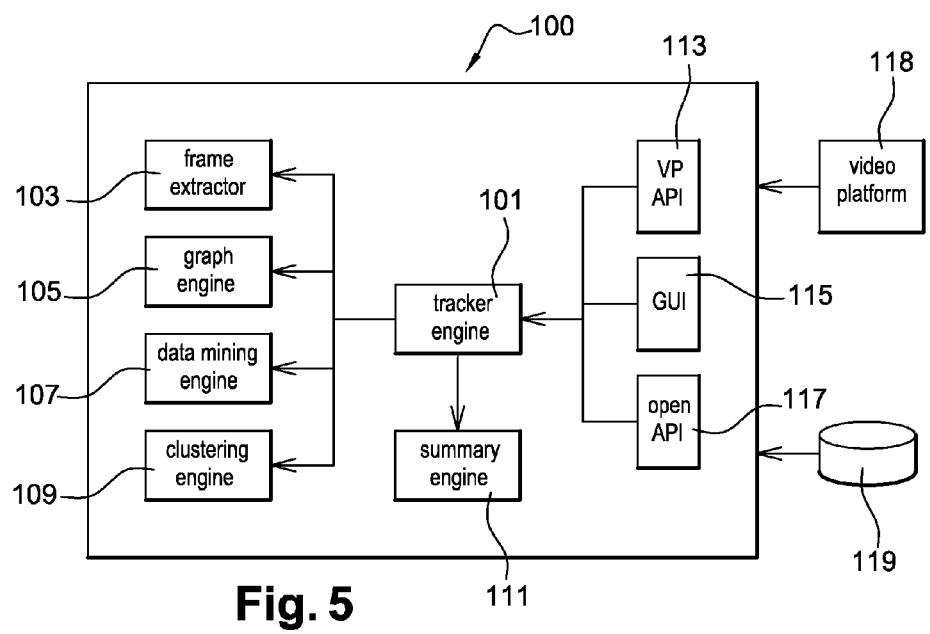

Some embodiments of the present disclosure also provide a device for automatic detection and tracking of one or multiple objects of interest in a video sequence comprising several successive frames captured with a moving camera. FIG. 5 is a schematic illustration of such a device.

The device 100 comprises means for performing the method according to embodiments described hereinabove. In particular, the device 100 includes a frame extractor 103 configured to segment each frame of the video sequence into regions depending on colour and producing a segmented image for each frame. The device 100 further includes a graph engine 105 configured to deduce from each of the segmented images a region adjacency graph comprising nodes and edges. As indicated previously, each node defines a region and each edge links two nodes of adjacent regions of the segmented image, and the region adjacency graphs deduced from the segmented images for said several successive frames form a set of region adjacency graphs. A data mining engine 107 of the device is configured to extract from the set of region adjacency graphs frequent spatio-temporal patterns.

Still referring to FIG. 5, the device 100 further comprises a clustering engine 109. The clustering engine 109 is configured to determine degrees of dissimilarity between the trajectories of the extracted frequent spatio-temporal patterns between successive frames. The clustering engine 109 is further configured to cluster the frequent spatio-temporal patterns to produce at least one cluster corresponding to one object of interest among said one or multiple objects of interest according to the determined degrees of dissimilarity of the trajectories.

According to embodiments of the present disclosure, the device 100 for automatic detection and tracking of objects of interest may further include a summary engine 111 configured to summarize the video sequence using the one or multiple objects of interest detected and tracked in the video sequence in order to obtain a video summary.

Advantageously, the device 100 according to embodiments disclosed herein may further comprise an interface means 113, 115, 117 configured to interface the device with a user or an application. For example, the interface means may comprise a video platform application programming interface (API) 113 enabling the video platform (such as YouTube) to use the object detection and tracking and/or summarizing functionalities of the device 100, i.e., a video may be processed without any interaction from a user. Alternatively, the interface means may include a GUI configured, for example, to permit a user to upload videos of which he is interested in a video summary. The video may be uploaded, for example, from the user's local computer hard-drive 119 or from an online video platform 118. The interface means may also include an open API 117, which may be based on a web service. The open API 117 enables interfacing the device 100 from any application (e.g., RESTful (Representational State Transfer) web services allow other applications to send Hypertext Transfer Protocol requests to the web service using GET and POST request methods).

A person skilled in the art would readily recognize that steps of embodiments of the above-described method can be performed by programmed computers. Herein, some embodiments are intended to cover program storage devices, e.g., digital data storage media, which are machine-executable and encode machine-executable or computer-executable programs of instructions where said instructions perform some or all of the steps of methods described herein. The program storage devices may be, e.g., digital memories, magnetic storage media such as magnetic discs or tapes, hard drives, or optically readable digital storage media. The embodiments are also intended to cover computers programmed to perform said steps of methods described herein. It will be appreciated by the skilled person that the flow charts and diagrams of the Figures represent embodiments of processes which may be substantially represented in a computer readable medium and so executed by a computer or processor, even if such computer or processor is not explicitly shown.

Although some embodiments of the present invention have been illustrated in the accompanying Drawings and described in the foregoing Detailed Description, it should be understood that the present invention is not limited to the disclosed embodiments, but is capable of numerous rearrangements, modifications and substitutions without departing from the invention as set forth and defined by the following claims.

The invention claimed is:

1. A method for automatic detection and tracking of one or multiple objects of interest in a video sequence comprising several successive frames captured with a moving camera, the method comprising:
   for each frame of the video sequence:
   segmenting the frame into regions depending on colour and producing a segmented image;
   deducing from the segmented image a region adjacency graph comprising nodes and edges, wherein each node defines a region and each edge links two nodes of adjacent regions of the segmented image;
   wherein the region adjacency graphs deduced from the segmented images for said several successive frames form a set of region adjacency graphs;
   extracting from the set of region adjacency graphs frequent spatio-temporal patterns;
   determining degrees of dissimilarity between trajectories of the extracted frequent spatio-temporal patterns between the region adjacency graphs of said successive frames; and
   clustering the frequent spatio-temporal patterns to produce at least one cluster corresponding to one object of interest among said one or multiple objects of interest according to the determined degrees of dissimilarity of the trajectories.

2. The method according to claim 1, wherein the extracting comprises extracting spatio-temporal patterns which occur at least once in a predetermined number of region adjacency graphs among the set of region adjacency graphs.

3. The method according to claim 1, wherein the extracting comprises:
   determining, for each spatio-temporal pattern, an Euclidian distance separating two successive occurrences of the spatio-temporal pattern in two distinct region adjacency graphs; and
   extracting the spatio-temporal patterns for which the determined Euclidian distance is below a spatial threshold.

4. The method according to claim 1, wherein the extracting comprises:
   determining, for each spatio-temporal pattern, the number of region adjacency graphs separating two successive occurrences of the spatio-temporal pattern in two distinct region adjacency graphs; and
   extracting the spatio-temporal patterns for which the determined number of region adjacency graphs is below a temporal threshold.

5. The method according to claim 1, wherein the determining the degrees of dissimilarity of the trajectories comprises:
   determining a centroid for each spatio-temporal pattern in the region adjacency graphs;
   determining an Euclidian distance between two distinct centroids corresponding to two distinct spatio-temporal patterns in each region adjacency graph; and
   calculating an average of the Euclidian distances between two distinct centroids on several region adjacency graphs.

6. The method according to claim 5, wherein the determining the degrees of dissimilarity of the trajectories further comprises:
   interpolating, for one or several region adjacency graphs separating two successive occurrences of each of the spatio-temporal patterns in two distinct region adjacency graphs, a centroid; and
   calculating an average of the Euclidian distances between two distinct centroids on all region adjacency graphs.

7. The method according to claim 5, wherein the clustering comprises:
   clustering the spatio-temporal patterns for which the calculated average of the Euclidian distances between two distinct centroids is below a dissimilarity threshold.

8. The method according to claim 7, wherein the clustering further comprises:
   clustering the frequent spatio-temporal patterns to produce a hierarchized set of clusters corresponding to multiple objects of interest; and
   selecting among the hierarchized set of clusters only the clusters for which the degree of dissimilarity is below a predetermined threshold.

9. The method according to claim 1, further comprising:
   summarizing the video sequence using the one or multiple objects of interest detected and tracked in the video sequence in order to obtain a video summary.

10. The method according to claim 9, wherein the summarizing comprises:
   determining interacting objects of interest based on spatial overlapping of their trajectories.

11. A device for automatic detection and tracking of one or multiple objects of interest in a video sequence comprising several successive frames captured with a moving camera, the device comprising:
   at least one processor configured as:
      a frame extractor configured to segment each frame of the video sequence into regions depending on colour and producing a segmented image for each frame;
      a graph engine configured to deduce from each of the segmented images a region adjacency graph comprising nodes and edges, wherein each node defines a region and each edge links two nodes of adjacent regions of the segmented image;
   wherein the region adjacency graphs deduced from the segmented images for said several successive frames form a set of region adjacency graphs;
      a data mining engine configured to extract from the set of region adjacency graphs frequent spatio-temporal patterns; and
      a clustering engine configured to:
      determine degrees of dissimilarity between trajectories of the extracted frequent spatio-temporal patterns between the region adjacency graphs of said successive frames; and
      cluster the frequent spatio-temporal patterns to produce at least one cluster corresponding to one object of interest among said one or multiple objects of interest according to the determined degrees of dissimilarity of the trajectories.

12. The device according to claim 11, wherein the at least one processor is further configured as:
   a summary engine configured to summarize the video sequence using the one or multiple objects of interest detected and tracked in the video sequence in order to obtain a video summary.

13. A non-transitory computer readable medium comprising instructions for controlling a computer system to perform a method for automatic detection and tracking of one or multiple objects of interest in a video sequence comprising several successive frames captured with a moving camera according to claim 1.

14. A non-transitory computer program product comprising computer-executable instructions for performing a method for automatic detection and tracking of one or multiple objects of interest in a video sequence comprising several successive frames captured with a moving camera according to claim 1, when the program is run on a computer.

* * * * *